Aug. 19, 1952
L. LEE, II
2,607,327
FAN AND PUMP DRIVE FOR ENGINE COOLING
Filed Feb. 5, 1949
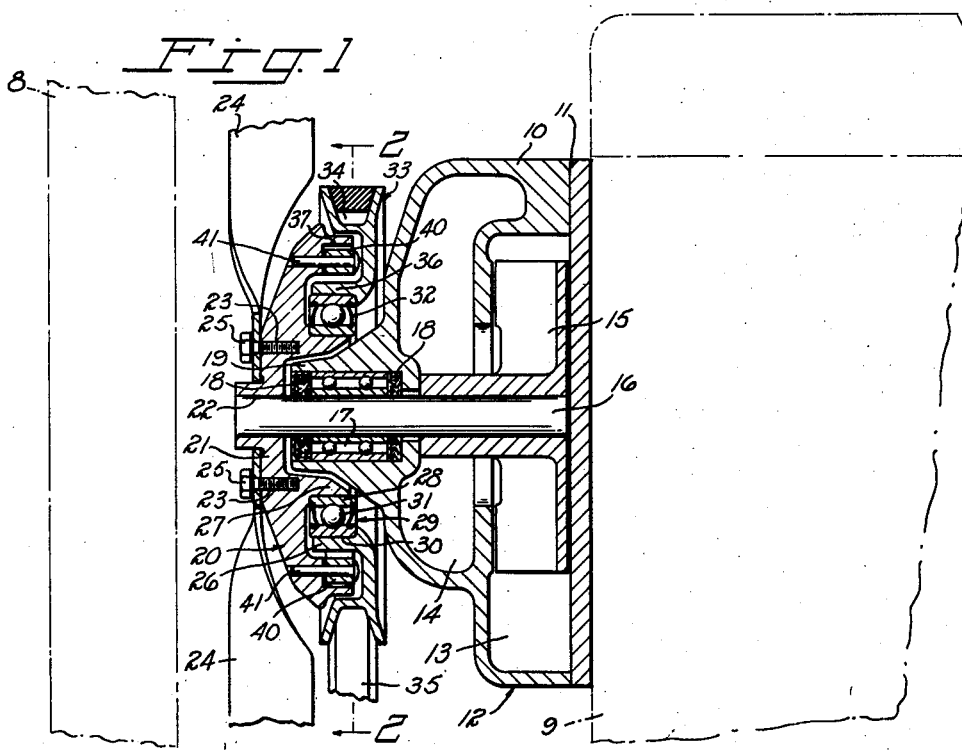
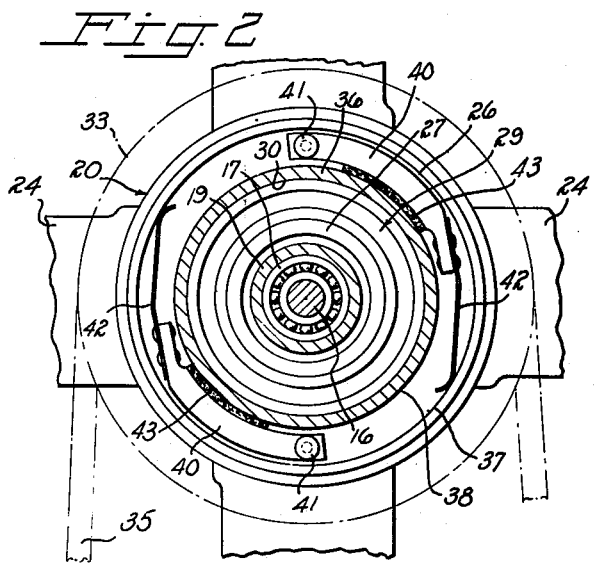
Inventor
LEIGHTON LEE, II
By
Lindsey, Prutzman + Just
Attorneys Patented Aug. 19, 1952

2,607,327

UNITED STATES PATENT OFFICE 2,607,327

FAN AND PUMP DRIVE FOR ENGINE COOLING

Leighton Lee, II, Rocky Hill, Conn.

Application February 5, 1949, Serial No. 74,807

6 Claims. (Cl. 123—41.11)

The present invention relates generally to cooling systems for internal combustion engines and, more particularly, to a novel and improved mechanism for driving the fan and coolant pump normally utilized in connection with liquid cooled engines of the types employed in automotive vehicles.

In conventional liquid cooling systems employed with the internal combustion engines of automotive vehicles, a liquid coolant, usually water, is continuously circulated or cycled through the engine block and a heat interchanger or radiator. The heat interchanger or radiator is disposed so that it will be in the path of an airstream created when the vehicle is in motion, which airstream on passing through the interchanger or radiator absorbs heat from the coolant. To create a positive flow of air through the radiator, which is particularly necessary when the vehicle is stationary or moving at slow speeds, a fan is provided adjacent the radiator and arranged to be continuously driven by the engine. Circulation of the liquid coolant through the cooling system is effected by a fluid pump likewise arranged to be continuously driven by the engine.

For simplicity of construction and installation, the pump rotor and fan may be mounted in coaxial alignment on a single shaft which is arranged to be driven by a belt and pulleys from the engine crankshaft. The present invention is particularly applicable to this type of arrangement of the pump and fan.

In accordance with the invention, I have observed that, although conventional automotive cooling systems are provided with a direct invariable drive between the engine and the fan and pump, there is no direct relationship between the speed of the engine and the required speed of the pump and fan. For example, when the driven speed of the pump and fan in relationship to the speed of the engine is such that adequate cooling is effected at low engine speeds, then the speed of operation of the fan and pump becomes excessive at higher engine speeds. This results in inefficiency because it not only wastes power at higher engine speeds which renders the automotive vehicle more costly to operate, but it also decreases the total power output of the engine which is available for driving the vehicle, thus adversely affecting acceleration and top speed performance of the vehicle.

I have also observed that the use of a direct invariable drive between the engine and the fan and pump has led to inefficient designing of the cooling system. For example, there is a practical limit to the speed at which the pump and fan may be driven inasmuch as high speed operation undesirably increases wear, vibration and noise as well as requires heavier and stronger construction of the fan and pump. Accordingly, in order to limit the maximum speed of the fan and pump, it has been necessary also to limit their speed of operation at low engine speeds. This has necessitated the use of radiators and fans and pumps which have a larger size or capacity than would be otherwise necessary if the cooling system were operated more efficiently at low engine speeds, i. e., at a higher pump and fan speed in relationship to engine speed. In general, most cooling systems for automotive engines are a compromise between the disadvantages at low engine speeds of a low drive ratio between the engine and the pump and fan and the disadvantages at high engine speeds of a high drive ratio between the engine and the pump and fan.

I have also observed, in accordance with the invention, that, when the automotive vehicle is driven, in which case the fan R. P. M. is less than the free wheeling R. P. M. for the air flow created at that speed, the flow of air through the radiator and the fan has a driving effect upon the fan. As the speed of the vehicle increases, of course, the flow of air increases and thus the torque exerted upon the fan by the flow of air also increases. In conventional installations, however, because the speed of the fan is increased by the engine in proportion to vehicle speed, and always exceeds the free wheeling speed of the fan for such resulting air flow, this torque serves no useful purpose except to lessen the torque required to be supplied by the engine to drive the fan. It has been proposed heretofore to disconnect the fan from the engine when the speed of the engine exceeds some predetermined value. However, such systems have not met with commercial success because they do not effect as great a saving in power consumption as expected when the vehicle is driven at high speeds probably because the power required to drive the fan even at excessive speeds is greatly diminished in view of the torque exerted by the flow of air. Furthermore, such systems are dangerous because they do not provide for operation of the fan when the vehicle is stopped and the motor is raced or when the vehicle is traveling at low speed in a low gear with consequent high speed of the engine. Also, such systems do not affect in any way the conventional and invariable direct drive of the water pump with the disadvantages referred to above.

Accordingly, it is an object of my invention to provide a new drive for the pump and fan of an automotive engine cooling system which will be safe in operation and which will avoid the operation of fan and pump at excessive speeds with a consequent saving in power consumption, wear, noise and vibration, as well as permitting the use of smaller radiators, pumps and/or fans.

A further object of the invention is to limit the maximum speed of the fan so that torque provided by the air flow will be available to drive the pump not only to take some of the load of the engine but also, when the speed of the vehicle is sufficient, to drive the pump without any assistance whatsoever from the engine, thus effecting a very great saving in power consumption when the vehicle is driven at high speeds.

Another object is to attain the foregoing objects in a mechanism which is simple and compact and which can be economically and easily produced at a cost sufficiently low to be practical and yet which will be rugged in construction so that it can be used over long periods of time and under hard usage without the need for frequent repair or replacement.

Another object is to provide such a mechanism which can be so designed that it may be used as a replacement unit for the conventional fan mount and driven pulley of automotive vehicles now on the market whereby installation of my improved mechanism is facilitated without the need for remodeling or discarding of the remaining parts of the cooling system.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings—

Figure 1 is a fragmentary side view, partially in cross section, showing a fan and water pump assembly provided with a novel driving mechanism embodying my invention; and Fig. 2 is a cross sectional view taken along the line 2—2 of Fig. 1.

Referring to the drawings, there is shown in Fig. 1 a water pump 10 of conventional design for use in an automotive vehicle engine cooling system. The water pump 10 is provided with a base plate 11 adapted to be mounted on an engine block indicated diagrammatically by the dot and dash line 9 and a housing 12 forming a pump chamber 13 and an outlet portion 14. As will be appreciated by one skilled in the art, the pump chamber 13 is adapted to be connected for communication with the fluid passageways of the engine block while the outlet portion 14 is adapted to be connected for communication to the top of the radiator indicated diagrammatically by the dot and dash line 8. A pump rotor or impeller 15 is mounted for rotation in the chamber 13 and is adapted to be driven by the shaft 16 to which it is affixed, which shaft is rotatably supported or journaled in an anti-friction bearing 17 carried by the nose portion 19 of the housing 12. Sealing material 18 is provided to prevent the escape of water from the pump along the shaft 16.

Attached to the front end of the shaft 16 is an embodiment of the improved fan mounting and drive mechanism 20 of the present invention. The mechanism 20 includes at the forward end a generally cup shaped member 21 adapted to partially surround the nose portion 19 of the pump housing 12 and formed with a central opening 22 arranged to receive the shaft 16. The member 21 is adapted to be fixed to the shaft 16 as by a press fit at the opening 22.

The cup shaped member 21 is provided in its forward end with a series of tapped holes 23 to permit the fan blades 24 of a conventional fan assembly to be secured thereto as by bolts 25. As is customary, the fan blades 24 are disposed immediately behind the radiator 8.

The cup shaped member 21 is provided in its rear portion with an annular groove or depression 26 to form a hub or shoulder portion 27 onto which can be fixed as by press fit the inner race 28 of an anti-friction bearing 29. Anti-friction bearing 29 can be of any suitable design and is shown in the specific embodiment as comprising the aforesaid inner race 28, an outer race 30, a series of balls 31 and bearing seals 32.

The outer race 30 is fixed to a specially designed pulley 33 which in addition to having a conventional groove 34 in its outer edge adapted to receive a standard automotive fan belt 35, is provided with a relatively wide central opening defined by the flange 36 which flange extends into the recess 26 of cup member 21 and into which is press fit the outer race 30.

As thus far described, it will be seen that the fan and pump rotor are fixed to the shaft 16 and must be rotated in unison while the pulley 33 is freely rotatable relative to the fan and pump by reason of its mounting on the anti-friction bearing 29.

In accordance with the invention, means is provided for engaging, disengaging, or slippingly engaging the pulley 33 and the cup shaped member 21 responsive to the speed of rotation of the cup shaped member 21. In the specific embodiment, this means comprises a plurality of arcuate lever arms 40 which are pivotally mounted at one end on the cup shaped member 21 as by means of pins 41 so that they may pivot inwardly and outwardly in the plane of rotation of the member 21 within the confines of the annular groove 26. Inward pivoting of the lever arms 40 is caused by spring members 42 which are riveted at one end to the free ends of the lever arms 40 and which at the other end bear against the outer rim 37 of the cup shaped member 21. When the arms 40 are pressed inwardly by the spring members 42, they frictionally engage the outer wall 38 of the flange 36 which frictional engagement is increased by pads 43 composed of suitable friction or brake material.

When the cup shaped member 21 is rotated, the arms 40, of course, rotate therewith and are thus subjected to a centrifugal force tending to pivot them outwardly from engagement with the wall 38 against the action of the spring members 42. As explained more fully hereinafter, the arms 40 and the spring members 42 are designed so that, at moderate speeds of rotation of the member 21, the force exerted by the springs will be sufficiently greater than the centrifugal force so that there will be no slippage between member 21 and pulley 33 creating in effect a direct drive between the engine and the pump and fan, so that at an intermediate speed range the centrifugal force will be sufficient to cause slippage increasing in amount as the speed increases and so that above this range the centrifugal force entirely overcomes the force of the spring members 42 to completely disengage the pulley 33 from the member 21.

When installed in an automotive vehicle, the improved and novel fan and pump drive of my invention can be arranged to provide a direct drive between the engine and pump and fan until the vehicle reaches a predetermined velocity of, for example, about 40 to 45 miles per hour corresponding, also by way of example, to a pump shaft speed of 2000 R. P. M. Then, as the vehicle speeds up beyond this point, slippage between the pulley 33 and member 21 begins to occur with the result that the speed of the fan and pump remains substantially constant at about 2000 R. P. M. even though the pulley 33 continues to speed up directly with the engine. The effect is that a decreasing amount and proportion of torque is transmitted from the engine to the fan and pump just sufficient to maintain the shaft speed at the exemplary value of 2000 R. P. M. Eventually, as for example, at a vehicle speed in the neighborhood of about 60 M. P. H., the engine is completely disengaged from the pump and fan and the fan now energized solely by the flow of air created by the movement of the vehicle is able to drive the pump alone. Thereafter, as the vehicle speed further increases, there may be an adidtional but slight increase in the speed of the fan and pump all without any torque transmitted from the engine.

As a result of this operation of the fan and pump drive of my invention, a very substantial saving can be made in the power required to operate the vehicle at high speeds, all without adversely affecting the desired functioning of the fan and pump, and with the further advantage of limiting the maximum speed which the pump and fan will attain. Depending on the design of the cooling system, this saving may be as much as 10 to 20% at speeds in the neighborhood of 60 M. P. H. or better.

It also is possible with the use of my improved fan and pump drive to use a higher ratio of pump and fan speed to engine speed when the engine is directly driving the fan and pump. This permits the use of smaller fans, pumps and/or radiators with consequent saving in cost and space.

It also will be noted that my improved fan and pump drive is substantially the same size as the conventional fan mounting and pulley frequently employed on pump shafts, it may be secured to the shaft in the same way, and it will mount a conventional fan blade assembly. It thus is a complete interchangeable unit which requires no additional space and may be installed without any design change to the pump, pump shaft, fan or fan belt.

The device of my invention is a balanced unit of simple but rugged construction so that it will stand up under hard usage, it may be easily manufactured at low cost, and it is foolproof in operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a vehicle engine cooling system, the combination comprising a fluid pump having a rotatable impeller, a shaft for driving said impeller, a fan permanently fixed to said shaft for rotation therewith and disposed in the path of a flow of air created when the vehicle is in motion, a pulley adapted to be driven by the engine and rotatably mounted on the shaft, clutch means for engaging and disengaging the pulley and the shaft, and means responsive to the speed of rotation of the fan for engaging the clutch below a predetermined fan speed whereby the engine will drive the fan and pump and for disengaging the clutch above a predetermined fan speed whereby the pump will be driven solely by the fan.

2. In a vehicle engine cooling system, the combination comprising a fluid pump, a shaft for driving said pump, a fan permanently fixed to said shaft for rotation therewith and disposed in the path of a flow of air created when the vehicle is in motion, a pulley arranged to be driven by the vehicle engine and mounted for rotation about the shaft, means including a clutch for selectively disengaging, engaging and slippingly engaging the pulley and the shaft, and centrifugal means rotated by the shaft for engaging the clutch at a lower speed range of the fan and shaft whereby the engine will drive the fan and pump, for slippingly engaging the clutch at an intermediate speed range of the fan and shaft whereby the engine will partially drive the fan and pump, and for disengaging the clutch at a higher speed range whereby the shaft will rotate free of the pulley and the pump will be driven solely by the fan.

3. In a vehicle engine cooling system, the combination comprising a fluid pump, a shaft for driving said pump, a member fixed to the shaft, a fan fixed to said member and disposed in the path of a flow of air created when the vehicle is in motion, a pulley freely mounted on the member and having an annular shoulder, an arm pivotally mounted on said member for pivoting movement in the plane of rotation of the member, said arm being adapted to be urged outwardly by centrifugal force when said member is rotated and adapted, when pivoted inwardly, to frictionally engage said shoulder, and spring means urging said arm inwardly.

4. In a vehicle engine cooling system having a fluid pump, a shaft for driving said pump, and a fan permanently fixed to the shaft for rotation therewith and disposed in the path of a flow of air created when the vehicle is in motion, the combination of a driving element for said shaft comprising a member fixed to the shaft for rotation therewith, a pulley adapted to be driven by the vehicle engine freely mounted on the member, a clutch operative between the pulley and the said member, and centrifugal means carried by the said member for operating the clutch responsive to the speed of said fan whereby the pulley is disengaged at high fan speeds and engaged at low fan speeds.

5. A pump and fan drive mechanism for use in a vehicle engine cooling system of the type having a pump and a pump shaft to which is adapted to be attached a pulley and fan, comprising a cup shaped member adapted to be fixed to the shaft having means for the attachment of a fan to the exterior thereof, a pulley having an annular flange rotatably mounted interiorly of said cup member, a pivoted arm carried by said cup member adapted to frictionally engage said pulley flange when pivoted inwardly and adapted to be moved outwardly by centrifugal force when the member is rotated, and spring means normally urging the arm into said frictional engagement with the pulley.

6. A pump and fan drive mechanism for use in a vehicle engine cooling system of the type having a pump and a pump shaft adapted to have a pulley and fan attached thereto, comprising a member adapted to form a support for a fan and having a hub adapted to be fixed to the shaft, said member having an annular recess on one end coaxial with and extending around said hub, a pulley having an annular flange rotatably supported on said hub within said recess, a plurality of arms pivotally mounted in said recess for pivoting movement in the plane of rotation of the member and adapted when pivoted inwardly to frictionally engage said flange, said members being adapted to be urged outwardly by centrifugal force when the member is rotated, and spring means urging the arms inwardly.

LEIGHTON LEE, II.

REFERENCES CITED

The following references are of record in the file of this patent:

UNITED STATES PATENTS

| Number | Name | Date |
|---|---|---|
| 1,782,513 | Roos | Nov. 25, 1930 |
| 1,832,726 | Newcombe | Nov. 17, 1931 |
| 2,045,870 | Paton | June 30, 1936 |
| 2,438,161 | Greenlee | Mar. 23, 1948 |
| 2,452,650 | Greenlee | Nov. 2, 1948 |
| 2,506,520 | Spase | May 2, 1950 |